United States Patent
Kobayashi

(10) Patent No.: US 8,831,344 B2
(45) Date of Patent: Sep. 9, 2014

(54) APPARATUS AND METHOD FOR ADJUSTING HUE

(75) Inventor: Atsushi Kobayashi, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 218 days.

(21) Appl. No.: 13/463,996

(22) Filed: May 4, 2012

(65) Prior Publication Data

US 2012/0281916 A1  Nov. 8, 2012

(30) Foreign Application Priority Data

May 4, 2011  (KR) .................. 10-2011-0042625

(51) Int. Cl.
*G06K 9/00* (2006.01)
*H04N 9/64* (2006.01)
*H04N 1/60* (2006.01)

(52) U.S. Cl.
CPC ............... *H04N 1/608* (2013.01); *H04N 9/643* (2013.01); *H04N 1/6075* (2013.01)
USPC ........... 382/167; 345/604; 348/630; 348/654; 358/1.9; 358/518; 382/100

(58) Field of Classification Search
CPC .............................. H04N 1/6075; H04N 9/643
See application file for complete search history.

(56) References Cited

U.S. PATENT DOCUMENTS

| | | | |
|---|---|---|---|
| 5,539,540 A * | 7/1996 | Spaulding et al. ............ 358/518 |
| 7,327,404 B2 * | 2/2008 | Chen et al. ................... 348/654 |
| 7,773,259 B2 * | 8/2010 | Hsu et al. ...................... 358/1.9 |
| 8,049,765 B2 | 11/2011 | Ahn et al. |
| 2002/0051088 A1 * | 5/2002 | Ikeda et al. .................. 348/630 |
| 2003/0044042 A1 * | 3/2003 | King et al. .................... 382/100 |
| 2005/0219260 A1 * | 10/2005 | Satomi et al. ................ 345/604 |
| 2008/0013135 A1 | 1/2008 | Hsu et al. |
| 2008/0252794 A1 | 10/2008 | Su et al. |

FOREIGN PATENT DOCUMENTS

| | | | |
|---|---|---|---|
| JP | 2005-151212 A | 6/2005 |
| JP | 2005-175823 A | 6/2005 |
| KR | 10-2008-0010832 A | 1/2008 |
| KR | 10-2008-0105272 A | 12/2008 |
| KR | 10-2008-0112780 A | 12/2008 |

* cited by examiner

*Primary Examiner* — Tsung-Yin Tsai

(74) *Attorney, Agent, or Firm* — Sughrue Mion, PLLC

(57) ABSTRACT

An apparatus and method for adjusting hue in an image processing device are provided. The method includes: setting a rotation angle of hue of each of regions of an image divided into a predetermined number about a central point; calculating coordinates of hue values Cr and Cb of an input pixel to determine in which of the regions the pixel is located; calculating an angle of the pixel in the determined region; calculating a movement angle using rotation angles set for the determined region and an adjacent region, and determining whether interpolation is to be performed to the angle of the pixel based on a difference between the movement angle and the angle of the pixel; and if it is determined that the interpolation is to be performed, calculating an interpolation angle using the movement angle and the angle of the pixel, and moving the pixel by the interpolation angle.

18 Claims, 4 Drawing Sheets

FIG. 4A

| for start angle abs(HUE(x) HUE(x−1)) | gap angle | s_boundary_intp[2:0] | movement angle (deg) |
|---|---|---|---|
|  | 0 | 0 | no movement |
| 1 | 0 ~ 0.70 | 1 | 0 ~ 0.224 |
| 2~3 | 0.70 ~ 2.11 | 2 | 0 ~ 0.448 |
| 4~6 | 2.11 ~ 4.22 | 3 | 0 ~ 0.895 |
| 7~10 | 4.22 ~ 7.03 | 4 | 0 ~ 1.790 |
| 11~15 | 7.03 ~10.55 | 5 | 0 ~ 3.581 |
| 16~21 | 10.55 ~ 14.77 | 6 | 0 ~ 7.162 |
| 22~255 | 14.77 ~ 180.00 | 7 | 0 ~ 14.324 |

FIG. 4B

| for end angle abs(HUE(x)− HUE(x+1)) | gap angle | e_boundary_intp[2:0] | movement angle (deg) |
|---|---|---|---|
| 0 | 0 | 0 | no movement |
| 1 | 0 ~ 0.70 | 1 | 0 ~ 0.224 |
| 2~3 | 0.70 ~ 2.11 | 2 | 0 ~ 0.448 |
| 4~6 | 2.11 ~ 4.22 | 3 | 0 ~ 0.895 |
| 7~10 | 4.22 ~ 7.03 | 4 | 0 ~ 1.790 |
| 11~15 | 7.03 ~ 10.55 | 5 | 0 ~ 3.581 |
| 16~21 | 10.55 ~ 14.77 | 6 | 0 ~ 7.162 |
| 22~255 | 14.77 ~ 180.00 | 7 | 0 ~ 14.324 |

APPARATUS AND METHOD FOR ADJUSTING HUE

CROSS-REFERENCE TO RELATED PATENT APPLICATION

This application claims priority from Korean Patent Application No. 10-2011-0042625, filed on May 4, 2011, in the Korean Intellectual Property Office, the disclosure of which is incorporated herein in its entirety by reference.

BACKGROUND

1. Field

Apparatuses and methods consistent with exemplary embodiment relate to adjusting hue in an image processing device.

2. Description of the Related Art

In image processing devices such as a monitoring camera, auto white balance (AWB) processing is performed to deal with a color temperature of a broad light source. AWB is a function of analyzing components of three primary colors of red, green, and blue (RGB) in an entire screen and properly calculating an R-component amplification degree and a B-component amplification degree according to an acquired screen. However, for example, when a Natrium lamp having an extremely low color temperature is used as a light source to capture an image, it may be impossible to approach original color reproduction only by adjusting an R-component amplification degree and a B-component amplification degree. Thus, in this case, a process of approaching original color reproduction may be performed by compulsively changing hue using a hue adjustment function.

The hue adjustment function is realized by converting primary components of RGB to brightness and hue components of YCbCr and rotating the brightness and hue components of YCbCr about a two-dimensional (2D) coordinate space of Cb and Cr. In this case, if the brightness and hue components of YCbCr are rotated about all coordinate spaces, hue of the entire screen is changed. Thus, for the 2D coordinate space of Cb and Cr, a plurality of regions are previously defined using angle areas based on a central point.

According to a related art, an entire image is divided into eight regions, regions of pixels to be processed are determined, every region is previously rotated by a predefined angle, and a rotating result is output. When this method is applied, if gradation exists over a plurality of adjacent regions, or if there is a big difference between angles designated to the plurality of adjacent regions, a large gradation gap due to rotation angle processing occurs at the boundary of the angle of the regions.

To prevent this, when there is a rotation angle difference between adjacent regions, rotation angles are commonly interpolated so that there is no problem in the hue of gradation. However, when rotation angles are interpolated in a fixed boundary of adjacent regions, although a large hue difference is removed, a value different from an originally designated rotation angle may be applied due to the interpolation.

SUMMARY

One or more exemplary embodiments provide an apparatus and method for adjusting hue without any bad influence by variably performing rotation angle hue interpolation at regional boundaries.

According to an aspect of an exemplary embodiment, there is provided a method of adjusting hue, the method including: (a) setting a rotation angle of hue of each of regions of an image divided into a predetermined number using angle areas about a central point; (b) calculating coordinates of hue values Cr and Cb of an input pixel to determine in which of the regions the pixel is located; (c) calculating an angle of the pixel in the determined region; (d) calculating a movement angle using a rotation angle set for the determined region and a rotation angle set for an adjacent region, and determining whether interpolation is to be performed to the angle of the pixel based on a difference between the movement angle and the angle of the pixel; and (e) if it is determined that the interpolation is to be performed, calculating an interpolation angle based on the movement angle and the angle of the pixel, and moving the pixel by the interpolation angle.

Operation (b) may include: (b-1) calculating the coordinates of the hue values Cr and Cb of the pixel; (b-2) rotating the coordinates by 45°; and (b-3) determining the region by determining hue polarities of the coordinates and the coordinates rotated by 45°.

Operation (c) may include calculating the angle of the pixel by normalizing a ratio between the hue values Cr and Cb.

Operation (d) may include searching for the movement angle which is preset as corresponding to an absolute value of a difference between the rotation angle set for the determined region and the rotation angle set for the adjacent region.

The method may further include, if it is determined that the interpolation is not to be performed as a result of the determination in operation (d), moving the pixel by the rotation angle set for the determined region.

According to an aspect of another exemplary embodiment, there is provided an apparatus for adjusting hue, the apparatus including: a determiner which calculates coordinates of hue values Cr and Cb of an input pixel to determine in which of regions of an image divided into a predetermined number the pixel is located, and calculates an angle of the pixel in the determined region; an interpolator which calculates a movement angle using a rotation angle set for the determined region and a rotation angle set for an adjacent region, determines whether interpolation is to be performed to the angle of the pixel based on a difference between the movement angle and the angle of the pixel, and calculates an interpolation angle based on the movement angle and the angle of the pixel; and a movement unit which moves the pixel by the interpolation angle.

The apparatus may further include a storage unit which set and stores a rotation angle of hue of each of the regions using angle areas about a central point.

The determiner may calculate the coordinates of the hue values Cr and Cb of the pixel, rotates the coordinates by 45°, and determines the region by determining hue polarities of the coordinates and the coordinates rotated by 45°.

The determiner may calculate the angle of the pixel by normalizing a ratio between the hue values Cr and Cb.

The interpolator may calculate the movement angle by searching a movement angle which is preset as corresponding to an absolute value of a difference between the rotation angle set for the determined region and the rotation angle set for the adjacent region.

BRIEF DESCRIPTION OF THE DRAWINGS

The above aspects will become more apparent by describing in detail exemplary embodiments thereof with reference to the attached drawings, in which:

FIGS. 4A and 4B illustrate lookup tables stored to determine hue interpolation in the apparatus of FIG. 1, according to an exemplary embodiment.

DETAILED DESCRIPTION OF THE EXEMPLARY EMBODIMENTS

Figure 1:
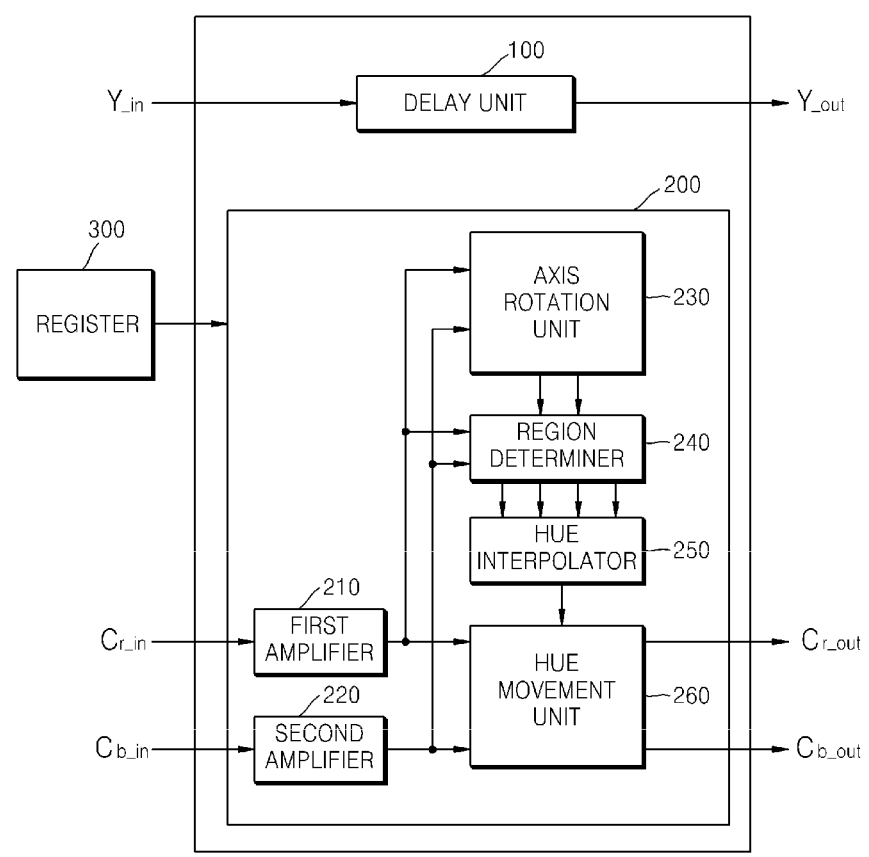
FIG. 1 is a block diagram of an apparatus for adjusting hue according to an exemplary embodiment.

The inventive concept may allow various kinds of change or modification and various changes in form, and exemplary embodiments will be illustrated in drawings and described in detail in the specification. However, it should be understood that the exemplary embodiments do not limit the inventive concept to a specific disclosing form but include every modified, equivalent, or replaced one within the spirit and technical scope inventive concept. In the following description, well-known functions or constructions are not described in detail since they would obscure the inventive concept with unnecessary detail.

Although terms, such as 'first' and 'second', can be used to describe various elements, the elements cannot be limited by the terms. The terms can be used to classify a certain element from another element.

The terminology used in the application is used only to describe exemplary embodiments and does not have any intention to limit the inventive concept. An expression in the singular includes an expression in the plural unless they are clearly different from each other in a context. In the application, it should be understood that terms, such as 'include' and 'have', are used to indicate the existence of an implemented feature, number, step, operation, element, part, or a combination of them without excluding in advance the possibility of existence or addition of one or more other features, numbers, steps, operations, elements, parts, or combinations of them.

The exemplary embodiments will now be described more fully with reference to the accompanying drawings. Like reference numerals in the drawings denote like elements, and thus, their repetitive description will be omitted.

Expressions such as "at least one of," when preceding a list of elements, modify the entire list of elements and do not modify the individual elements of the list.

FIG. 1 is a block diagram of an apparatus for adjusting hue according to an exemplary embodiment. Referring to FIG. 1, the apparatus includes a delay unit 100, a hue compensator 200, and a register 300. The hue compensator 200 includes a first amplifier 210, a second amplifier 220, an axis rotation unit 230, a region determiner 240, a hue interpolator 250, and a hue movement unit 260.

A brightness signal Y_in from among YCbCr on which AWB has been performed is input to the delay unit 100, is delayed by 12 cycles, and is output as Y_out.

Hue signals Cb_in and Cr_in from among the YCbCr on which AWB has been performed are input to the hue compensator 200, are hue-compensated, and are output as Cb_out and Cr_out.

Figure 2:
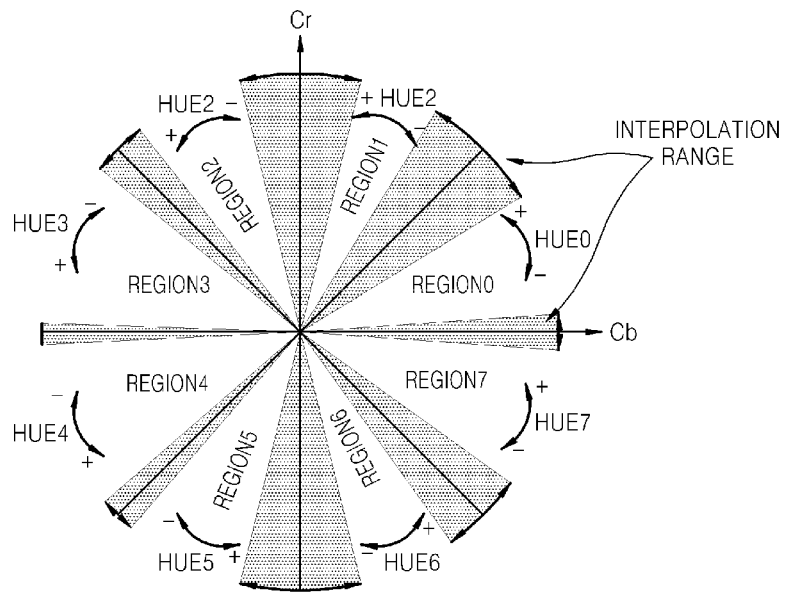
FIG. 2 illustrates variable interpolation ranges in regions divided by the apparatus of FIG. 1, according to an exemplary embodiment.

In the register 300, a rotation angle of hue of each of the regions divided into a predetermined number using angle areas about a central point is set and stored. FIG. 2 shows eight regions, namely, first to eighth regions region0 to region7, divided by 45° about the central point. For example, the first region region0 corresponds to 0° to 45°, and the second region region1 corresponds to 45° to 90°. Likewise, the eighth region region7 corresponds to 315° to 360°.

A rotation angle of hue of each of the regions divided into the predetermined number stored in the register 300 may be stored as rotation ratio. For example, the first region region0 corresponds to 0% to 12.5% (45/360*100), and the second region region1 corresponds to 12.5% to 25% (90/360*100). Likewise, the eight region region7 corresponds to 87.5% (315/360*100) to 100%.

A user previously sets a rotation angle for voluntarily moving hue pixels located in each region and stores set rotation angles in the register 300. For example, by setting a rotation angle as +45° for the first region region0, pixels located in the first region region0 except for an interpolation range are moved by rotating the pixels by 45°. In addition, by setting a rotation angle as +40° for the eighth region region7, pixels located in the eighth region region7 except for an interpolation range are moved by rotating the pixels by 40°. In addition, by setting a rotation angle as 0° for the second region region1, pixels located in the second region region1 except for an interpolation range are not rotationally moved.

Furthermore, a rotation angle stored in the register 300 may be stored as rotation ratio. For example, a rotation ratio of the first region region0 is set to +45/360=12.5% and pixels located in the first region region0 except for an interpolation range are moved by rotating the pixels by 12.5%. A rotation ratio of the eighth region region7 is set to +40/360=11.1% and pixels located in the eighth region region7 except for an interpolation range are moved by rotating the pixels by 11.1%. A rotation ratio of the second region region1 is set to 0 and pixels located in the second region region0 except for an interpolation range are not rotationally moved.

The hue compensator 200 is described in detail below.

A hue signal Cr_in from among hue signals Cb_in and Cr_in of a current pixel is input to the first amplifier 210 and is amplified.

A hue signal Cb_in from among the hue signals Cb_in and Cr_in of the current pixel is input to the second amplifier 220 and is amplified.

The axis rotation unit 230 rotates amplified hue signals Cb and Cr by 45° in a 2D coordinate space which consist of amplified hue signals Cb' and Cr'.

Figure 3A:
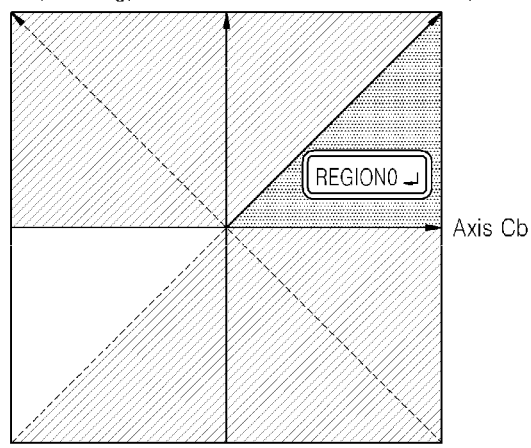
FIGS. 3A-3C illustrate region determination performed by the apparatus of FIG. 1, according to exemplary embodiments.
Figure 3B:
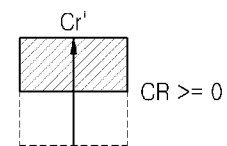
Figure 3C:
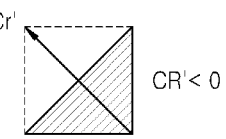

The region determiner 240 calculates 2D coordinates of the amplified hue signals Cb and Cr and rotated amplified hue signal Cb' and Cr', and determines polarities of the calculated coordinates and coordinates rotated by 45° by the axis rotation unit 230 to determine in which region of the eight regions the current pixel is located. FIGS. 3A-3C shows an example in which the first region region0 is determined as where the current pixel is located. When the 2D coordinates of the amplified hue signals Cb and Cr and rotated amplified hue signal Cb' and Cr'_are calculated, if the signal Cr is equal to or greater than 0 as shown in FIG. 3A, and if a signal Cr' is less than 0 on the coordinates rotated by 45° by the axis rotation unit 230 as shown in FIG. 3B, the first region region0 is determined. Likewise, the second region region1 is determined if the signal Cb is equal to or greater than 0 and if the signal Cr' is equal to or greater than 0. The third region region2 is determined if the signal Cb is less than 0 and if a signal Cb' is equal to or greater than 0. The fourth region region3 is determined if the signal Cr is equal to or greater than 0 and if the signal Cb' is less than 0. The fifth region region4 is determined if the signal Cr is less than 0 and if the signal Cr' is equal to or greater than 0. The sixth region region5 is determined if the signal Cb is less than 0 and if the signal Cr' is less than 0. The seventh region region6 is determined if the signal Cb is equal to or greater than 0 and if the signal Cb' is less than 0. The eighth region region7 is determined if the signal Cr is less than 0 and if the signal Cb' is equal to or greater than 0.

If the region determination of the region determiner 240 is completed, an angle θ of the current pixel in the determined region is calculated. The angle θ is calculated by normalizing a ratio between the hue values Cr and Cb, and an equation for calculating an angle of the current pixel is Equation 1.

$$\theta \cong \sin\theta \cong \tan\theta = \frac{Cr}{Cb} \text{ (if } \theta \text{ is small enough)} \quad (1)$$

The hue interpolator 250 calculates an absolute value of a difference between a rotation angle set to the determined region and a rotation angle set to an adjacent region, and searches lookup tables shown in FIGS. 4A and 4B for a movement angle according to the calculated absolute value. The hue interpolator 250 stores the lookup tables in which angles to be moved according to absolute values of differences between current regions and adjacent regions are stored. FIG. 4A shows a lookup table of start regions, and FIG. 4B shows a lookup table of end regions. For example, when a pixel in the first region region0 is located in a boundary region near 0°, the boundary region of 0° is indicated as a start region, and when a pixel in the first region region0 is located in a boundary region near 45°, the boundary region of 45° is indicated as an end region. In addition, an interpolation range (a gray region) is determined based on an absolute value of a difference between a current region and an adjacent region. In FIG. 2, an interpolation range per region is differently set.

For example, if the determined region is the first region region0, a corresponding rotation angle is set to 45° in the register 300, and an adjacent region may be the second region region1 or the eighth region region7. In this case, if it is assumed that a pixel is located in the boundary region near 0° in the first region region0, an adjacent region is the eighth region region7. A rotation angle of the eighth region region7 is set to 40° in the register 300. The hue interpolator 250 calculates an absolute value of a difference between 45° and 40° as 5, and 0-0.895 is searched for from the lookup tables as an angle to move.

Furthermore, although an interpolation range per region is shown as an angle in FIGS. 4A-4B, the interpolation range per region may be set as an interpolation ratio with respect to the maximum interpolation angle, which is 14.324°. For example, if the determined region is the first region region0, a rotation ratio of the first region region0 is set to 12.5% in the register 300, and an adjacent region may be the second region region1 or the eighth region region7. Here, if it is assumed a pixel is located in the boundary region near 0° in the first region region0, an adjacent region is the eighth region region7. A rotation ratio of the eighth region region7 is set to 11.1% in the register 300. The hue interpolator 250 calculates a difference between 12.5% and 11.1% as 1.4%, and 0-12.5% is searched for from the lookup tables as a ratio to move.

The hue interpolator 250 compares the found movement angle with the angle of the current pixel, which is calculated using Equation 1, determines that interpolation is unnecessary if the movement angle is less than the angle of the current pixel, and determines that interpolation is necessary if the movement angle is equal to or greater than the angle of the current pixel. A case where interpolation is unnecessary is a case where the current pixel is located outside an interpolation range (gray region), and a case where interpolation is necessary is a case where the current pixel is located within an interpolation range (gray region). When interpolation is unnecessary, the hue interpolator 250 accesses the register 300 to move the current pixel by the set rotation angle. However, when interpolation is necessary, the hue interpolator 250 calculates an interpolation angle using Equation 2.

Interpolation angle=(RA1(128−ratio)+RA2×ratio)/128 (2)

In Equation 2, RA1 denotes a rotation angle stored in the register 300 with respect to a current region, RA2 denotes a rotation angle stored in the register 300 with respect to an adjacent region, and ratio denotes (angle of a current pixel/movement angle)×128.

Furthermore, the rotation angle shown in Equation 2 may also be expressed as a rotation ratio shown in Equation 3.

Interpolation ratio(%)=(interpolation angle/360)×100 (3)

The hue movement unit 260 outputs finally interpolated hue signals Cb_out and Cr_out by moving the current pixel by a corresponding angle according to the interpolation angle calculated by the hue interpolator 250 or the rotation angle stored in the register 300. Furthermore, the hue movement unit 260 outputs finally interpolated hue signals Cb_out and Cr_out by moving the current pixel by a corresponding ratio according to the interpolation ratio calculated by the hue interpolator 250 or the rotation ratio stored in the register 300.

Figure 5:
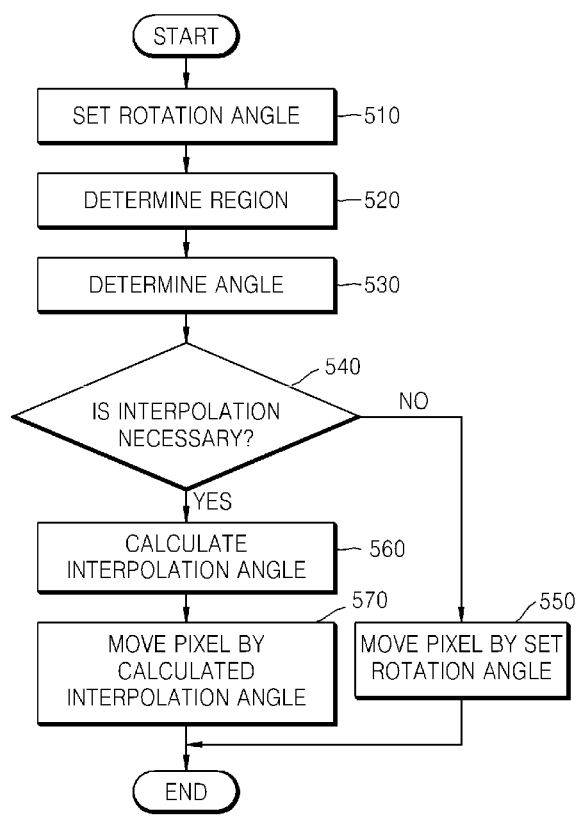
FIG. 5 is a flowchart illustrating a method of adjusting hue, according to an exemplary embodiment.

FIG. 5 is a flowchart illustrating a method of adjusting hue, according to an embodiment.

Referring to FIG. 5, in operation 510, a user sets rotation angles for eight divided regions and stores the rotation angles in the register 300.

In operation 520, a region for hue signals Cb and Cr of an input pixel is determined. That is, 2D coordinates of the input hue signals Cb_in and Cr_in are calculated, and it is determined in which region of the eight regions the pixel is located by determining polarities of the calculated coordinates and coordinates rotated by 45° by the axis rotation unit 230.

When the region determination is completed, an angle of the pixel is determined in the determined region in operation S530. The angle of the pixel is calculated by normalizing a ratio between hue values Cr and Cb using Equation 1.

When the region determination and the angle determination are completed, it is determined in operation 540 whether the pixel is interpolated. To do this, an absolute value of a difference between a rotation angle set to the determined region and a rotation angle set to an adjacent region is first calculated, and a movement angle according to the calculated absolute value is searched for from the lookup tables shown in FIGS. 4A and 4B. Thereafter, the found movement angle is compared with the angle of the pixel calculated using Equation 1, and if the movement angle is less than the angle of the pixel, it is determined that interpolation is unnecessary, and if the movement angle is equal to or greater than the angle of the pixel, it is determined that interpolation is necessary.

If interpolation is unnecessary, the register 300 is accessed to move the pixel by the set rotation angle, and the pixel is moved by the rotation angle in operation 550.

Otherwise, if interpolation is necessary, an interpolation angle is calculated using Equation 2 in operation 560, and the pixel is moved by the calculated interpolation angle in operation 570.

As described above, according to the exemplary embodiments, hue may be adjusted without any bad influence on an image by variably performing rotation angle hue interpolation at regional boundaries.

Specific executions described in the present invention are exemplary embodiments and do not limit the scope of the inventive concept even in any method. For conciseness of the specification, a disclosure of related art electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete mention, such as "requisite" or "important", it may not be a necessarily required component for application.

The use of the term "said" or a similar directional term in the specification (in particular, in the claims) may correspond to both the singular and the plural. In addition, when a range is disclosed in the exemplary embodiments, inventions to which individual values belonging to the range are applied are included (if there is no disclosure opposed to this), and this is the same as that each of the individual values forming the range is disclosed in the detailed description of the exemplary embodiments. Finally, for steps forming the methods according to the inventive concept, if an order is not clearly disclosed or, if there is no disclosure opposed to the clear order, the steps can be performed in a proper order. The inventive concept is not necessarily limited to the disclosed order of the steps. The use of all illustrations or illustrative terms (for example, and so forth, etc.) in the exemplary embodiments is simply to describe the inventive concept in detail, and the scope of the inventive concept is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

What is claimed is:

1. A method of adjusting hue, the method comprising:
   (a) setting a rotation angle of hue of each of regions of an image divided into a predetermined number using angle areas about a central point;
   (b) calculating coordinates of hue values Cr and Cb of an input pixel to determine in which of the regions the pixel is located;
   (c) calculating an angle of the pixel in the determined region;
   (d) calculating a movement angle using a rotation angle set for the determined region and a rotation angle set for an adjacent region, and determining whether interpolation is to be performed to the angle of the pixel based on a difference between the movement angle and the angle of the pixel; and
   (e) if it is determined that the interpolation is to be performed, calculating an interpolation angle based on the movement angle and the angle of the pixel, and moving the pixel by the interpolation angle,
   wherein, in operation (d), it is determined that the interpolation is to be performed if the movement angle is equal to or greater than the angle of the pixel, and it is determined that the interpolation is not to be performed if the movement angle is less than the angle of the pixel.

2. The method of claim 1, wherein operation (b) comprises:
   (b-1) calculating the coordinates of the hue values Cr and Cb of the pixel;
   (b-2) rotating the coordinates by 45°; and
   (b-3) determining the region by determining hue polarities of the coordinates and the coordinates rotated by 45°.

3. The method of claim 1, wherein operation (c) comprises calculating the angle of the pixel by normalizing a ratio between the hue values Cr and Cb.

4. The method of claim 1, wherein, in operation (c), the angle of the pixel is calculated by an equation of $$\theta \cong \sin\theta \cong \tan\theta = \frac{Cr}{Cb}.$$

5. The method of claim 1, wherein operation (d) comprises searching for the movement angle which is preset as corresponding to an absolute value of a difference between the rotation angle set for the determined region and the rotation angle set for the adjacent region.

6. The method of claim 5, wherein the movement angle is one of a plurality of movement angles preset respectively for a plurality of values including the absolute value of the different between the rotation angle set for the determined region and the rotation angle set for the adjacent region.

7. The method of claim 1, further comprising, if it is determined that the interpolation is not to be performed as a result of the determination in operation (d), moving the pixel by the rotation angle set for the determined region.

8. The method of claim 1, further comprising, in operation (e), calculating an interpolation ratio by using the movement angle and the angle of the pixel and moving the pixel by the interpolation ratio.

9. The method of claim 1, wherein, in operation (e), the interpolation angle is calculated by an equation as follows:

the interpolation angle=(the rotation angle set for the determined region(128−ratio)+the rotation angle set for the adjacent region×ratio)/128, where the ration is (the angle of the pixel/the movement angle)×128.

10. An apparatus for adjusting hue, the apparatus comprising:
    a determiner which calculates coordinates of hue values Cr and Cb of an input pixel to determine in which of regions of an image divided into a predetermined number the pixel is located, and calculates an angle of the pixel in the determined region;
    an interpolator which calculates a movement angle using a rotation angle set for the determined region and a rotation angle set for an adjacent region, determines whether interpolation is to be performed to the angle of the pixel based on a difference between the movement angle and the angle of the pixel, and calculates an interpolation angle based on the movement angle and the angle of the pixel; and
    a movement unit which moves the pixel by the interpolation angle,
    wherein the interpolator determines that the interpolation is to be performed if the movement angle is equal to or greater than the angle of the pixel, and determines that the interpolation is not to be performed if the movement angle is less than the angle of the pixel.

11. The apparatus of claim 10, further comprising a storage unit which set and stores a rotation angle of hue of each of the regions using angle areas about a central point.

12. The apparatus of claim 10, wherein the determiner calculates the coordinates of the hue values Cr and Cb of the pixel, rotates the coordinates by 45°, and determines the region by determining hue polarities of the coordinates and the coordinates rotated by 45°.

13. The apparatus of claim 10, wherein the determiner calculates the angle of the pixel by normalizing a ratio between the hue values Cr and Cb.

14. The apparatus of claim 10, wherein the determiner calculates the angle of the pixel using an equation of $$\theta \cong \sin\theta \cong \tan\theta = \frac{Cr}{Cb}.$$

15. The apparatus of claim 10, wherein the interpolator calculates the movement angle by searching a movement angle which is preset as corresponding to an absolute value of a difference between the rotation angle set for the determined region and the rotation angle set for the adjacent region.

16. The apparatus of claim 10, wherein if the interpolator determines that the interpolation is not to be performed, the movement unit moves the pixel by the rotation angle set for the determined region.

17. The apparatus of claim 10, wherein the interpolator calculates an interpolation ratio by using the movement angle and the angle of the pixel and moves the pixel by the interpolation ratio.

18. The apparatus of claim 10, wherein the interpolator calculates the interpolation angle by an equation as follows:

the interpolation angle=(the rotation angle set for the determined region(128−ratio)+the rotation angle set for the adjacent region×ratio)/128, where the ration is (the angle of the pixel/the movement angle)×128.

* * * * *